United States Patent
Nguyen et al.

(10) Patent No.: US 8,204,336 B2
(45) Date of Patent: Jun. 19, 2012

(54) REMOVING NOISE BY ADDING THE INPUT IMAGE TO A REFERENCE IMAGE

(75) Inventors: Khang Nguyen, Osaka (JP); Yusuke Monobe, Kyoto (JP); Masataka Ejima, Osaka (JP)

(73) Assignee: Panasonic Corporation, Osaka (JP)

( * ) Notice: Subject to any disclaimer, the term of this patent is extended or adjusted under 35 U.S.C. 154(b) by 266 days.

(21) Appl. No.: 12/675,848

(22) PCT Filed: Jul. 15, 2009

(86) PCT No.: PCT/JP2009/003328
§ 371 (c)(1),
(2), (4) Date: Mar. 1, 2010

(87) PCT Pub. No.: WO2010/007777
PCT Pub. Date: Jan. 21, 2010

(65) Prior Publication Data
US 2010/0260437 A1    Oct. 14, 2010

(30) Foreign Application Priority Data
Jul. 16, 2008   (JP) ................................. 2008-184728

(51) Int. Cl.
*G06K 9/40* (2006.01)
*G06K 9/36* (2006.01)
*G06K 9/46* (2006.01)
*H04N 5/00* (2011.01)
(52) U.S. Cl. ......... 382/275; 382/236; 348/607; 348/608
(58) Field of Classification Search ........................ None
See application file for complete search history.

(56) References Cited

U.S. PATENT DOCUMENTS
6,041,145 A    3/2000   Hayashi et al.
(Continued)

FOREIGN PATENT DOCUMENTS
JP          9-187008        7/1997
(Continued)

OTHER PUBLICATIONS

Eric Dubois and Shaker Sabri, "Noise Reduction in Image Sequences Using Motion-Compensated Temporal Filtering", IEEE Transactions on Communications, 7vol. COM-32, No. 7, Jul. 1984, pp. 826-831.*

(Continued)

*Primary Examiner* — Li Liu
(74) *Attorney, Agent, or Firm* — Wenderoth, Lind & Ponack, L.L.P.

(57) ABSTRACT

An image processing device (10) removes noise from an input image by adding the input image to a reference image, and includes: a motion estimation unit (1) which generates motion information for each of blocks of the input image; a motion compensation unit (3) which generates a motion-compensated reference image; a block distortion amount calculation unit (5) which calculates a block distortion amount for each of blocks of the motion-compensated reference image; an addition ratio calculation unit (6) which calculates an addition ratio of a block of the motion-compensated reference image so that the addition ratio decreases as the block distortion increases; and an addition unit (4) which perform weighted sum on a pixel value of the block of the motion-compensated reference image and a pixel value of a block of the input image, using the addition ratio.

10 Claims, 9 Drawing Sheets

U.S. PATENT DOCUMENTS

| | | | |
|---|---|---|---|
| 6,122,314 | A | 9/2000 | Brüls et al. |
| 7,085,318 | B2 | 8/2006 | Kondo et al. |
| 7,365,801 | B2 | 4/2008 | Kondo |
| 2002/0080882 | A1 | 6/2002 | Kitagawa |
| 2003/0122967 | A1 | 7/2003 | Kondo et al. |
| 2004/0264802 | A1 | 12/2004 | Kondo |
| 2008/0002063 | A1 | 1/2008 | Kimura et al. |
| 2008/0291300 | A1 | 11/2008 | Hitomi et al. |

FOREIGN PATENT DOCUMENTS

| | | |
|---|---|---|
| JP | 11-504490 | 4/1999 |
| JP | 2001-069344 | 3/2001 |
| JP | 2001-359098 | 12/2001 |
| JP | 2002-223374 | 8/2002 |
| JP | 2002-252793 | 9/2002 |
| JP | 3960258 | 5/2007 |
| JP | 2008-016904 | 1/2008 |
| JP | 2008-294601 | 12/2008 |
| WO | 97/30545 | 8/1997 |
| WO | 01/97510 | 12/2001 |

OTHER PUBLICATIONS

Boyce, "Noise Reduction of Image Sequences Using Adaptive Motion Compensated Frame Averaging", IEEE, pp. III-461 through III-464, Sep. 1992.*

International Search Report issued Oct. 20, 2009 in International (PCT) Application No. PCT/JP2009/003328.

* cited by examiner

REMOVING NOISE BY ADDING THE INPUT IMAGE TO A REFERENCE IMAGE

TECHNICAL FIELD

The present invention relates to an image processing device which removes noise from an input image.

BACKGROUND ART

It has become difficult to ensure a sufficient amount of exposure at the time of imaging along with an increase in speed of cameras and miniaturization of imaging elements. As a result, a captured image becomes a very noisy image. Here, the noise occurred in the image can be removed by a signal processing. A noise removal processing method can be classified roughly into a spatial filter processing and a temporal noise removal processing.

When the noise is removed by a spatial filter, there are problems such as a tendency for an edge of an image to be blurred and a decrease in saturation. On the other hand, the temporal noise removal processing makes it possible to suppress occurrence of the problems when the noise is removed by the spatial filter, while effectively removing noise.

As a conventional temporal noise removal method, there is a method in which noise is removed by performing spatial motion compensation on images in a time direction and then adding each of pixels in an input image and a corresponding one of pixels obtained by the motion compensation.

Figure 9:
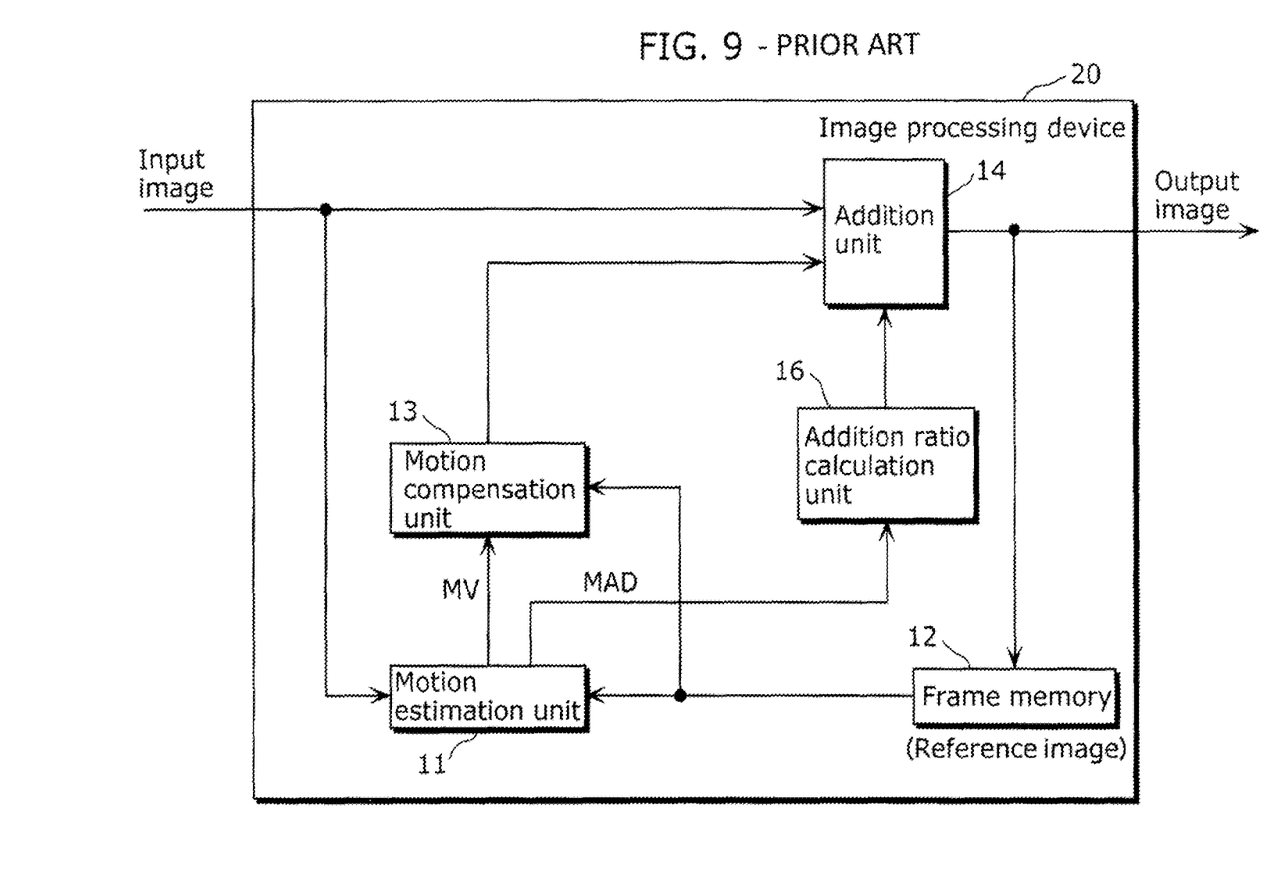
FIG. 9 is a functional block diagram of a conventional image processing device that performs a temporal noise removal processing.

FIG. 9 is a functional block diagram of a conventional image processing device that performs the temporal noise removal processing.

As shown in FIG. 9, a conventional image processing device 20 includes a motion estimation unit 11, a frame memory 12, a motion compensation unit 13, an addition unit 14, and an addition ratio calculation unit 16.

First, the motion estimation unit 11 performs motion estimation using an input image and a reference image that is stored in the frame memory 12, and determines locations, each of which is associated with a corresponding one of blocks in the input image, in the reference image.

Next, the motion compensation unit 13 generates block images of the reference image which are at the locations each associated with the corresponding one of the blocks in the input image, according to the motion information determined by the motion estimation unit 11. Then, the addition unit 14 adds the motion-compensated reference image and the input image on a per pixel basis. This addition processing reduces noise included in the input image by temporally smoothing random noise.

Here, the addition ratio calculation unit 16 calculates an addition ratio between the input image and the motion-compensated reference image. The addition unit 14 adds the input image and the motion-compensated reference image using the addition ratio calculated by the addition ratio calculation unit 16.

The addition processing described in Patent Literature 1 is described as a processing to be performed by the addition unit 14.

Figure 10:
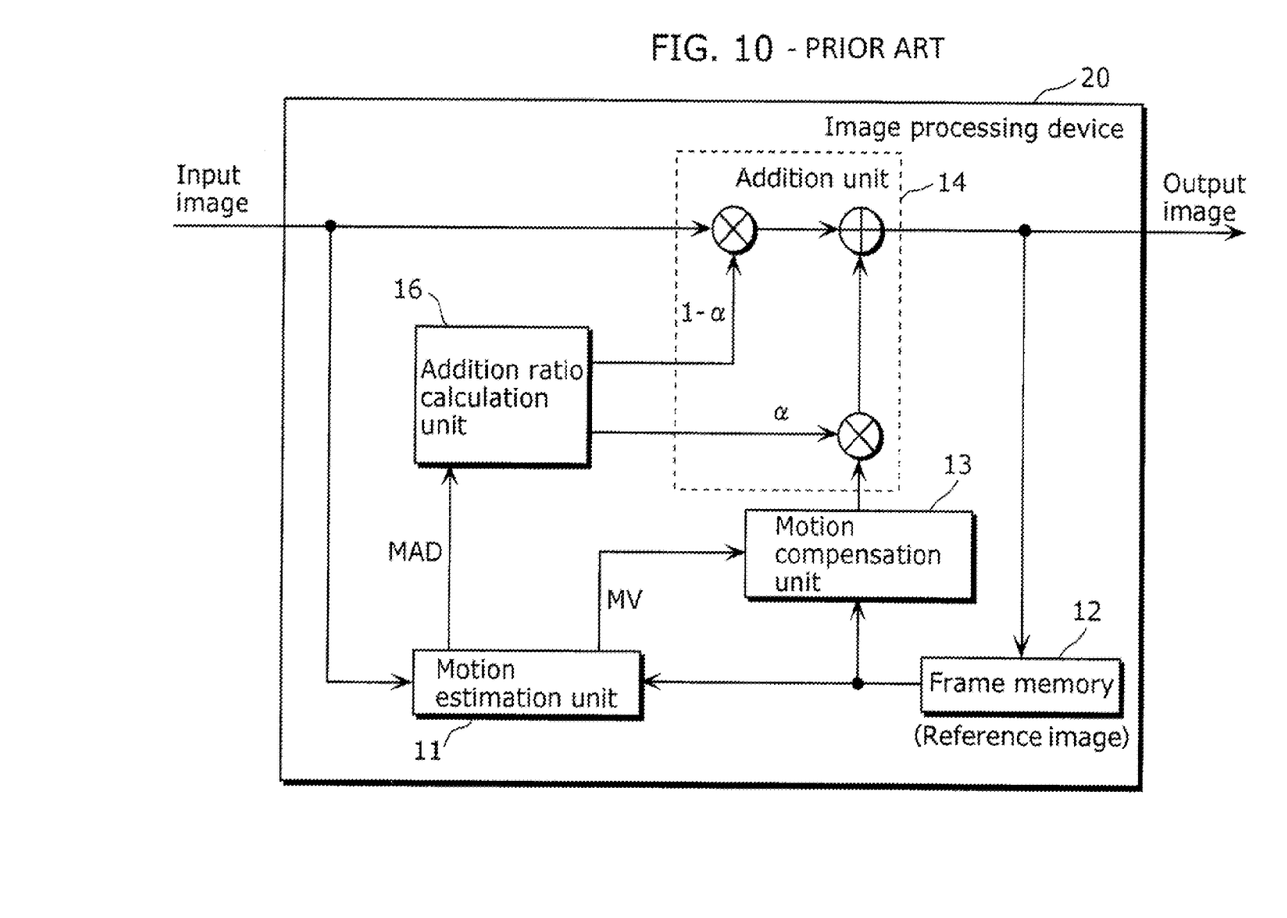
FIG. 10 is a diagram for describing a pixel addition method to be performed by the conventional image processing device.

FIG. 10 is a diagram for describing a pixel addition method performed by the conventional image processing device.

In the image processing device 20 shown in FIG. 10, the motion estimation unit 11 detects a motion vector (MV) using the input image and the reference image stored in the frame memory 12.

Next, the motion compensation unit 13 generates a motion-compensated reference image through motion compensation in which the motion vector is used. Furthermore, the addition ratio calculation unit 16 calculates a coefficient α using a value of MAD (Mean Absolute Deviation) calculated by the motion estimation unit 11. The MAD is an amount indicating an error between the two images. For example, MAD between an image 1 and an image 2 is defined by (Equation 1).

[Math. 1]

$$MAD = \frac{1}{N}\sum_{i=1}^{N}|f1(i) - f2(i)| \quad \text{(Equation 1)}$$

Here, f1(i) and f2(i) are pixel values of the images 1 and 2, respectively. N is the number of pixels.

Here, when MAD between a block of the input image and a block of the reference block which corresponds to the block is small, it means that a difference between the block of the input image and the block of the reference image is small. To put it differently, in this case, it is highly likely that the motion estimation has been performed correctly.

The coefficient α indicating an addition ratio of the reference image is increased by using such characteristics of the MAD when the MAD is small, and a noise removal effect is enhanced by increasing the addition ratio of the reference image.

On the other hand, since it is likely that the motion estimation has not been performed correctly when the MAD is large, the coefficient α is decreased, and control is performed so that the addition ratio of the reference image is decreased.

Moreover, in the noise removal processing, an image is divided into blocks and processed on a per block basis. Here, an addition ratio determined is an addition ratio per block. However, the addition unit 14 requires an addition ratio per pixel because the addition unit 14 performs addition on a per pixel basis. Thus, the conventional image processing device 20 calculates the addition ratio per pixel by interpolation, using addition ratios of neighboring blocks.

[Citation List]
[Patent Literature]
[PTL 1] Japanese Unexamined Patent Application Publication No. 11-504490

SUMMARY OF INVENTION

[Technical Problem]

However, there is a case where a motion vector cannot be detected in a very noisy image because it is not possible to distinguish between a signal and noise. Here, a block in an input image does not correspond to a block after motion compensation which is to be added to the block.

Stated differently, when a block in the input image includes much noise, there is a case where a block that does not normally correspond to the block is obtained through motion compensation as a block to be added to the block. In this case, it makes no sense to calculate an addition ratio using MAD as in the above conventional technique.

Furthermore, a motion compensation processing is performed on the per block basis. Accordingly, the motion compensation is performed on the blocks that do not correspond to each other as described above, and then block distortion occurs in the motion-compensated reference image.

Moreover, even when the block distortion occurs at a boundary of a block in the motion-compensated reference image, and when MAD between the block and a block of the input image which is to be added to the block is relatively small, the block distortion appears in an output image resulting from the addition. In other words, there is a problem that the quality of the output image deteriorates.

Figure 11:
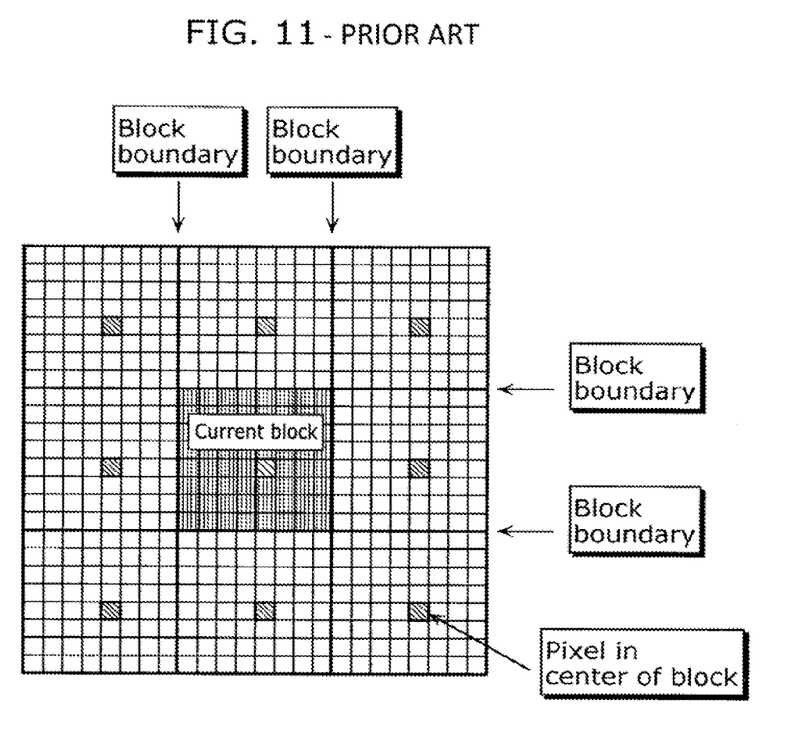
FIG. 11 is a diagram for describing a conventional method of interpolating addition ratios.

Furthermore, when the addition ratio per pixel is calculated from the addition ratio per block through the interpolation, as shown in FIG. 11, generally, the addition ratio per block is assumed to be an addition ratio of a pixel in the center of a block, and the interpolation is performed between the pixel in the center of the block and pixels each in the center of a corresponding one of peripheral blocks.

Here, for instance, as shown in FIG. 11, information about peripheral 8 blocks is required in order that the addition ratio is calculated for each of pixels of a current block. Thus, a memory for storing the information about the peripheral 8 blocks is required.

Further, when an image is generally processed on a per block basis, the processing is performed while raster scanning from the left top corner of the image. Consequently, an addition ratio of a block subsequent to the current block in raster order is to be used in the above-mentioned interpolation processing.

To put it differently, when the interpolation processing is to be performed on the current block, the interpolation processing cannot be performed because addition ratios of the peripheral blocks subsequent in raster order are not calculated. In short, there is a problem that a processing delay occurs because the processing needs to be first delayed and then suspended until processing of the peripheral blocks subsequent in raster order is completed.

In consideration of the above conventional problems, the present invention has an object to provide an image processing device and the like which can suppress the occurrence of the block distortion while removing the noise from the image.

In addition, the present invention has a further object to provide an image processing device and the like which can efficiently calculate the addition ratio per pixel from the addition ratio per block.

[Solution to Problem]

A image processing device of the present invention is an image processing device which removes noise from an input image by adding the input image to a reference image, and includes: a motion estimation unit which detects a motion between the input image and the reference image and generates motion information for each of blocks of the input image; a motion compensation unit which performs motion compensation on each of blocks of the reference image using the motion information generated by the motion estimation unit, so as to generate a motion-compensated reference image; a block distortion amount calculation unit which calculates a block distortion amount for each of blocks of the motion-compensated reference image generated by the motion compensation unit; an addition ratio calculation unit which calculates an addition ratio of a block of the motion-compensated reference image so that the addition ratio decreases as the block distortion increases; and an addition unit which perform weighted sum on a pixel value of the block of the motion-compensated reference image and a pixel value of a block of the input image, using the addition ratio calculated by the addition ratio calculation unit, the block of the input image corresponding to the block of the motion-compensated reference image.

With the above structure, even when block distortion occurs in the motion-compensated reference image to be added to the input image, the image processing device of the present invention makes it possible to calculate an amount of the block distortion before the addition, and decrease an addition ratio of the motion-compensated reference image according to the result of calculation. In other words, the present invention makes it possible to provide the image processing device which suppresses occurrence of block distortion while removing noise from an image.

Furthermore, the block distortion amount calculation unit may calculate the block distortion amount for the block of the reference image after motion compensation, using a difference in pixel value between neighboring pixels across a boundary between the blocks of the motion-compensated reference image.

Moreover, the block distortion amount calculation unit may calculate the block distortion amount so that the block distortion amount of the block of the motion-compensated reference image increases as the difference in pixel value between the neighboring pixels across the boundary between the blocks of the motion-compensated reference image increases.

Furthermore, the block distortion amount calculation unit may calculate the block distortion amount so that the block distortion amount of the block of the motion-compensated reference image increases as the difference in pixel value between the neighboring pixels across the boundary between the blocks of the motion-compensated reference image increase and a difference in pixel value between neighboring pixels across a boundary between the blocks of the input image decreases.

Moreover, the block distortion amount calculation unit may (i) calculate a first distortion amount which is a value that increases as a difference in pixel value between neighboring pixels across a boundary between the blocks of the motion-compensated reference image increases, (ii) calculate a second distortion amount which is a value that decreases as a difference in pixel value between neighboring pixels across a boundary between the blocks of the input image increases, and (iii) select a smaller one of the first distortion amount and the second distortion amount as the block distortion amount, so as to calculate the block distortion amount.

As stated above, the image processing device of the present invention calculates the block distortion amount of the motion-compensated reference image using the difference in pixel value between the neighboring pixels across the boundary of the blocks of the motion-compensated reference image. In addition, when a pattern considered as block distortion exists in the motion-compensated reference image and such a pattern does not exist at a position corresponding to a position of the pattern in the input image, the image processing device of the present invention makes it possible to calculate the block distortion amount as a larger value.

As a result, the addition ratio of the motion-compensated reference image decreases, and an influence of the block distortion in the motion-compensated reference image is suppressed.

To put it differently, even when the pattern considered as the block distortion exists in the motion-compensated reference image, and when such a pattern exists at the position corresponding to the position of the pattern in the input image, the addition ratio of the motion-compensated reference image is not decreased. In short, false recognition that the pattern originally existing in the input image is the block distortion caused by the motion compensation can be prevented.

Furthermore, the addition ratio calculation unit may calculate, through interpolation, an addition ratio for each of pixels included in the block of the motion-compensated reference image, using the addition ratio of the block of the motion-compensated reference image, and the addition unit may perform the weighted sum on the pixel values of the pixels included in the block of the motion-compensated reference image and pixel values of pixels included in the block of the input image, using the addition ratio for the each pixel calculated by the addition ratio calculation unit, the block of the input image corresponding to the block of the motion-compensated reference image.

Moreover, the addition ratio calculation unit may perform the interpolation using the addition ratio of the block of the motion-compensated reference image and respective addition ratios of at least an upper block, a left block, and an upper left block among blocks neighboring the block of the motion-compensated reference image.

Furthermore, assuming that the addition ratio of the block of the motion-compensated reference image calculated by the addition ratio calculation unit is an addition ratio of a pixel at a right bottom corner of the block of the motion-compensated reference image, the addition ratio calculation unit may calculate the addition ratio for the each pixel included in the block of the motion-compensated reference image through the interpolation performed using the addition ratio of the pixel at the right bottom corner and respective addition ratios of a pixel at a right bottom corner of each of the upper block, the left block, and the upper left block.

With the above structure, the addition ratio per pixel is calculated from the addition ratio calculated per block. Moreover, when the addition ratio per pixel is calculated, a processing delay is suppressed, because only addition ratios of other pixels that have been obtained at the time of the calculation are used.

Furthermore, when an addition ratio is calculated each of pixels of a block, it is only necessary to store in a memory only information about three blocks neighboring the block, and memory usage can be reduced.

Moreover, the present invention can be realized as an image processing method in which operations of unique constitutional elements of the image processing device of the present invention are steps, as a program for causing a computer to execute the steps, and as a recording medium on which the program is recorded. Further, the program can be distributed via transmission media such as the Internet or recording media such as DVDs.

In addition, the present invention can be realized as an integrated circuit including the unique constitutional elements of the image processing device of the present invention.

[Advantageous Effects of Invention]

With the present invention, when the noise included in the image is reduced using the temporal noise removal method, the influence of the block distortion on an output image can be suppressed, and the output image having good image quality can be obtained accordingly. Furthermore, compared to the conventional method, memory usage can be reduced. Moreover, there is no noise removal processing delay, and a processing regarding a block can be completed using the block.

DESCRIPTION OF EMBODIMENTS

The following describes an embodiment of the present invention with reference to the drawings.

Figure 1:
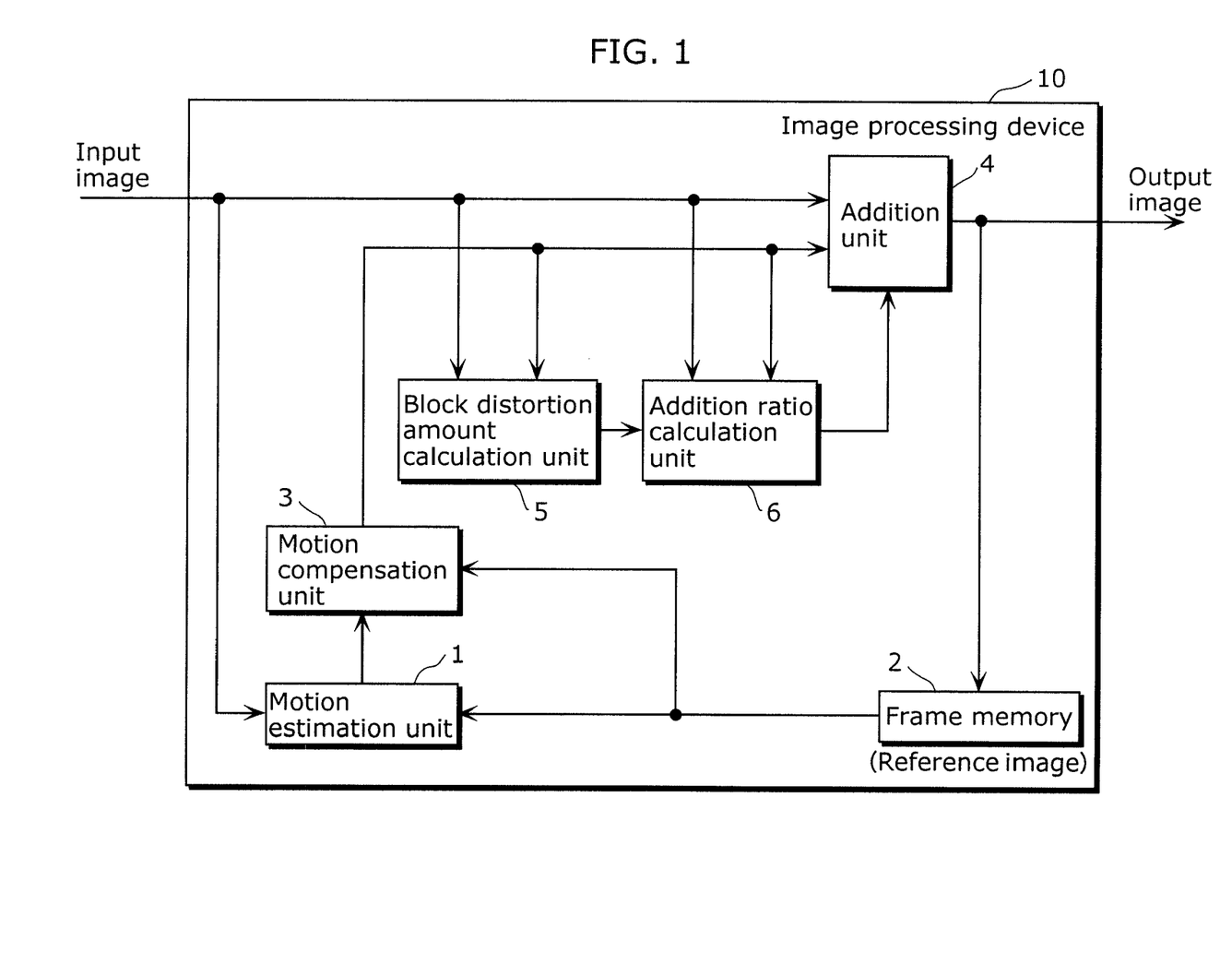
FIG. 1 is a diagram showing major functional components of an image processing device according to an embodiment of the present invention.

FIG. 1 is a diagram showing major functional components of an image processing device according to the embodiment of the present invention.

As shown in FIG. 1, an image processing device 10 according to the embodiment includes a motion estimation unit 1, a frame memory 2, a motion compensation unit 3, a block distortion amount calculation unit 5, an addition ratio calculation unit 6, and an addition unit 4.

The motion estimation unit 1 performs motion estimation on each of blocks of an input image using the input image and a reference image that is stored in the frame memory 2. Specifically, the motion estimation unit 1 generates motion information for each block. The motion compensation unit 3 generates a motion-compensated reference image using the motion information generated by the motion estimation unit 1.

The block distortion amount calculation unit 5 is an example of a block distortion amount calculation unit in the image processing device of the present invention, and calculates a block distortion amount using the input image and the motion-compensated reference image. The addition ratio calculation unit 6 calculates an addition ratio to be used in adding the input image and the motion-compensated reference image, using the block distortion amount calculated by the block distortion amount calculation unit 5. The addition unit 4 performs weighted sum on the input image and the reference image using the addition ratio calculated by the addition ratio calculation unit 6.

Figure 2:
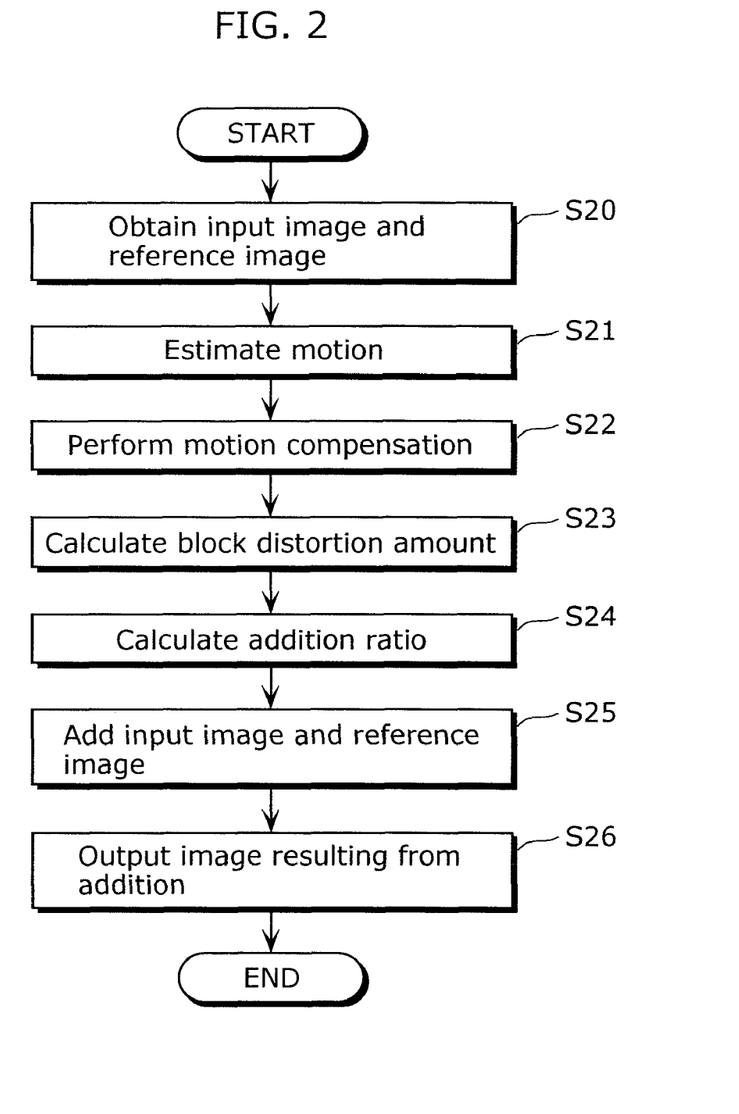
FIG. 2 is a flowchart showing a process flow of the image processing device according to the embodiment of the present invention.

The following describes a process flow of the image processing device 10 structured as above with reference to FIG. 2.

FIG. 2 is a flowchart showing a process flow of the image processing device according to the embodiment of the present invention.

First, the motion estimation unit 1 obtains an input image and a reference image that is stored in the frame memory 2 (S20). The motion estimation unit 1 further performs motion estimation using the input image and the reference image that are obtained (S21). The motion estimation unit 1 performs the motion estimation using block matching.

The block matching is a method of dividing an input image into blocks of predetermined size and locating positions of blocks, each of which is associated with a corresponding one of the blocks, of a reference image.

Specifically, a position of a block is repeatedly shifted within a predetermined search range in the reference image with respect to a corresponding block of the input image, and a difference (sum of absolute differences) in pixel value between each of the blocks at the shifted positions and the corresponding block of the input image is calculated at each of the shifted positions of the blocks.

A block of the reference image having the smallest calculation result is a block associated with a block of the input image. In addition, a difference in positions of the block of the input image and the corresponding block of the reference image is a result of the motion estimation.

In short, the motion estimation unit 1 outputs, as the motion information, information about a motion vector or the like indicating the difference in the positions of the blocks to the motion compensation unit 3.

It is to be noted that although the conventional block matching method has been employed as the motion estimation method in the present embodiment, other motion estimation methods such as block matching performed with phase-only correlation may be employed.

Next, the motion compensation unit 3 performs motion compensation on the reference image based on the motion information received from the motion estimation unit 1 (S22). Blocks after motion compensation each of which is associated with a corresponding one of the blocks of the input image are generated through this process.

Here, there is a case where a result of the motion estimation performed by the motion estimation unit 1 is incorrect. For example, noise becomes more dominant in a very noisy image than a signal. As a result, each of blocks of the input image and a corresponding one of the blocks of the reference image are associated, and a motion different from an actual motion can be estimated, the blocks of the input image and the reference image each having a similar noise pattern.

In addition, for instance, there is a case where a block associated with a block of the input image does not exist in the reference image due to a drastic change of a shape of an object in an image. In this case, a motion is not correctly estimated.

As stated above, unevenness occurs at a block boundary between a block whose motion is not estimated correctly and peripheral blocks in a motion-compensated reference image because a pattern of an image indicated by the block does not conform to a pattern of the image indicated by the peripheral blocks due to the incorrect estimation of the motion.

It is to be noted that the unevenness occurring at the block boundary is a visually discontinuous portion caused by a relatively large difference in pixel value between pixels neighboring to each other with the block boundary therebetween. When the uneven portion is added to the input image, block distortion occurs in the output image that is a result of the addition.

Thus, in the image processing device 10 according to the present embodiment, the block distortion amount calculation unit 5 detects block distortion of the motion-compensated reference image, and calculates the distortion amount, so as to prevent the block distortion in advance (S23). Then, the addition ratio calculation unit 6 controls an addition ratio according to the block distortion amount calculated by the block distortion amount calculation unit 5 so that the block distortion does not occur in the output image.

Figure 3:
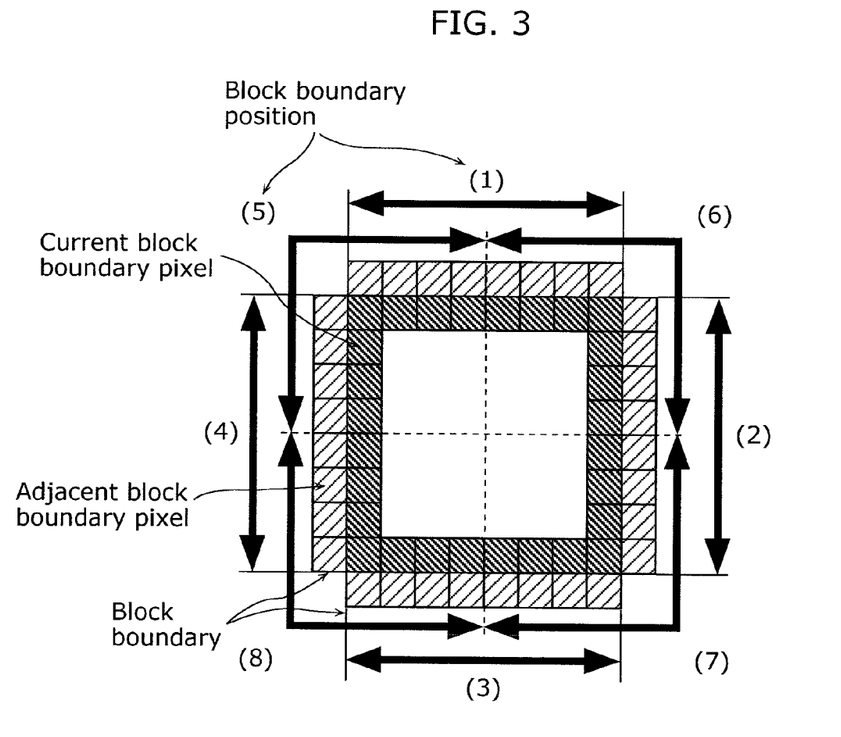
FIG. 3 is a diagram showing a detection position of block distortion according to the embodiment of the present invention.

The following describes a processing of the block distortion amount calculation unit 5 according to the embodiment with reference to FIG. 3.

FIG. 3 is a diagram showing positions at which block distortion is detected according to the embodiment of the present invention.

The block distortion amount calculation unit 5 detects block boundary unevenness between a current block and neighboring blocks. In the present embodiment, as shown in FIG. 3, the block distortion amount calculation unit 5 detects unevenness at each of 8 block boundary positions which are 4 sides and 4 corners of a block boundary.

For example, the block distortion amount calculation unit 5 detects block boundary unevenness between a current block (central block) and a neighboring block to the left of the current block based on current block boundary pixels and neighboring block boundary pixels that are arranged face-to-face with the left side of the block boundary (block boundary position (4)) of the current block therebetween.

In addition, for instance, the block distortion amount calculation unit 5 detects block boundary unevenness between the current block and neighboring blocks to the upper right of the current block based on current block boundary pixels and neighboring block boundary pixels that are arranged face-to-face with a right half of the top side of the block boundary (block boundary position (6)) of the current block therebetween as well as on current block boundary pixels and neighboring block boundary pixels that are arranged face-to-face with an upper half of the right side of the block boundary (block boundary position (6)) of the current block therebetween.

Where, in a block of a motion-compensated reference image, r is a block boundary position and diff_ref$_r$ is an amount of unevenness at the position, the block distortion amount calculation unit 5 calculates diff_ref$_r$ using the following (Equation 2).

[Math. 2]

$$\text{diff\_ref}_r = \left| \frac{1}{K} \sum_{i=1}^{K} (\text{f\_block}_r(i) - \text{f\_neighbour}_r(i)) \right| \quad \text{(Equation 2)}$$

Here, f_block$_r$(i) is a pixel value, at (block boundary) position r, in a block to be processed (current block). f_neighbour$_r$(i) is a pixel value, at (block boundary) position r, of a neighboring block of the block to be processed. K is a length of the block boundary (the number of pixels), and K=8 in an example shown in FIG. 3.

In addition, the block distortion amount calculation unit 5 also calculates an amount of evenness at a block boundary of a block of an input image (diff_curr$_r$), the block of the input image being associated with a block for which diff_ref$_r$ is calculated. A method of calculating diff_curr$_r$ is same as the method of calculating diff_ref$_r$, and diff_curr$_r$ is calculated for each of positions r=1 to 8 of the block of the input image.

The block distortion amount calculation unit 5 further calculates a block distortion amount at a block boundary after motion compensation using the aforementioned diff_ref$_r$ and diff_curr$_r$.

Specifically, when the unevenness at the block boundary of the input image is little and the unevenness at the block boundary of the motion-compensated reference image is great, it is highly likely that the unevenness is block distortion resulting from the motion compensation. In this case, the block distortion amount calculation unit 5 calculates a relatively large value as the block distortion amount.

On the other hand, when the unevenness at the block boundary of the input image is great and even when the unevenness at the block boundary of the motion-compensated reference image is great, the unevenness results from a pattern such as block distortion originally in the input image, and is not distortion caused by the motion compensation. In this case, the block distortion amount calculation unit 5 calculates a relatively small value as the block distortion amount.

Figure 4:
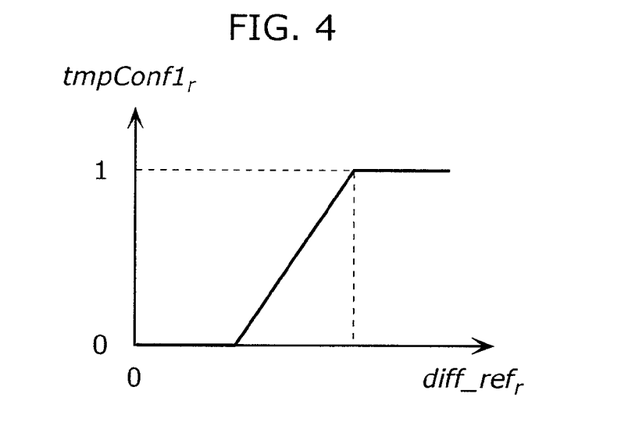
FIG. 4 is a diagram showing a method of calculating a block distortion amount based on a reference image according to the embodiment of the present invention.
Figure 5:
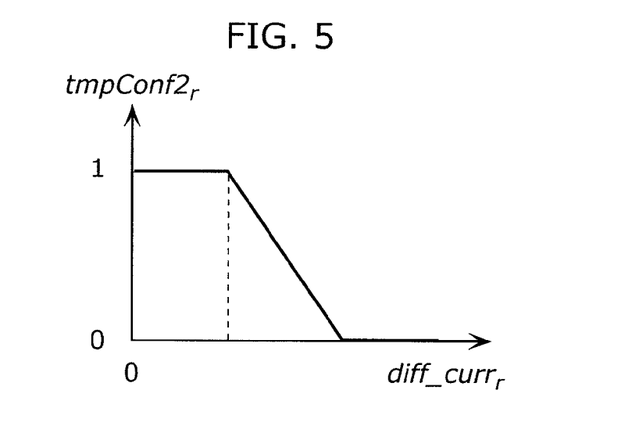
FIG. 5 is a diagram showing a method of calculating a block distortion amount based on an input image according to the embodiment of the present invention.

The block distortion amount calculation unit 5 uses, for example, calculation methods shown in FIGS. 4 and 5. The horizontal axis in FIG. 4 indicates magnitude of diff_ref$_r$. As stated above, diff_ref$_r$ shows the amount of unevenness at the block boundary position r of the motion-compensated reference image.

Because a probability that the unevenness at the block boundary of the motion-compensated reference image appears is higher with an increase in diff_ref$_r$, the block distortion amount calculation unit 5 calculates the block distortion amount of the block as a large value.

It is to be noted that tmpConf1$_r$ is an example of the first distortion amount in the image processing device of the present invention, and is a block distortion amount based on the unevenness at the block boundary of the motion-compensated reference image.

FIG. 4 shows conversion in which the block distortion amount (tmpConf1$_r$) increases with an increase in diff_ref$_r$.

The horizontal axis in FIG. 5 indicates magnitude of diff_curr$_r$. As stated above, diff_curr$_r$ shows the amount of unevenness at the block boundary of the input image.

The block distortion amount calculation unit 5 calculates the block distortion amount as a smaller value with an increase in diff_curr$_r$. This is because a pattern to be unevenness originally exists in the input image, and the unevenness is different from the unevenness caused by the motion compensation.

It is to be noted that tmpConf2$_r$ shown in FIG. 5 is an example of the second distortion amount in the image processing device of the present invention, and is a block distortion amount based on the unevenness at the block boundary of the input image.

FIG. 5 shows conversion in which the block distortion amount (tmpConf2$_r$) decreases with an increase in diff_curr$_r$.

After calculating tmpConf1$_r$ and tmpConf2$_r$, the block distortion amount calculation unit 5 calculates a block distortion amount (Conf$_r$) at the position r by determining the minimum value between tmpConf1$_r$ and tmpConf2$_r$ as shown in (Equation 3).

[Math. 3]

$$\text{Conf}_r = \min\{\text{tmpConf1}_r, \text{tmpConf2}_r\} \quad \text{(Equation 3)}$$

As shown in (Equation 4), the block distortion amount calculation unit 5 further calculates, at each of the positions r in the block boundary, a block distortion amount at a position where a probability that the block distortion occurs is the highest, that is, the largest Conf$_r$, as a block distortion amount (Conf) of an entire block.

[Math. 4]

$$\text{Conf} = \max\{\text{Conf}_r\} \quad \text{(Equation 4)}$$

It is to be noted that the block distortion amount calculation unit 5 detects the block distortion at each of the 8 positions which are a total of the 4 sides and 4 corners of the block in the present embodiment. However, the detection does not always need to be performed at the 8 boundary positions. For instance, the detection may be performed at the top side, left side, and upper left corner of a block boundary, that is, only positions r=1, 4, and 5.

In this case, because the block distortion amount calculation unit 5 uses, as pixel values after motion compensation to be used in performing a process of calculating the block distortion (Conf) with respect to the current block, only pixel values that have been obtained at the time for the process, the block distortion amount calculation unit 5 can perform the process efficiently. This suppresses, for example, a processing delay.

It is to be noted that it is only necessary for functions for calculating block distortion to satisfy a condition that the block distortion amount of the block increases as the difference in pixel value between the neighboring pixels across the block boundary of the blocks of the motion-compensated reference image increases and the difference in pixel value between the neighboring pixels at the block boundary of the blocks of the input image decreases. Consequently, the functions each shown in a corresponding one of FIGS. 4 and 5 and shown by a corresponding one of the equations may not be necessarily used.

When the block distortion amount calculation unit 5 calculates the block distortion amount in the above manner, the addition ratio calculation unit 6 calculates an addition ratio (S24).

In the calculation of the addition ratio, the block distortion amount per block Conf calculated by the block distortion amount calculation unit 5 is first converted into an addition ratio per block R_block.

Because block distortion is highly likely to occur in an image to be outputted after addition when a block distortion amount is large, the addition ratio calculation unit 6 performs conversion such that an addition ratio of a block of the motion-compensated reference image decreases with an increase in the block distortion amount. For example, the conversion is performed using the function as shown by the graph of FIG. 6.

Accordingly, the addition ratio of the block of the motion-compensated reference image is decreased when the difference in pixel value between the neighboring pixels at the block boundary of the motion-compensated reference image is relatively large and the difference in pixel value between the neighboring pixels at the block boundary of the input image is relatively small, that is, when it is predicted that a block distortion amount that appears in the image resulting from the addition is to be large.

As a result, the image degradation of the output image can be prevented, and the output image having good image quality is obtained with the noise removed.

Figure 6:
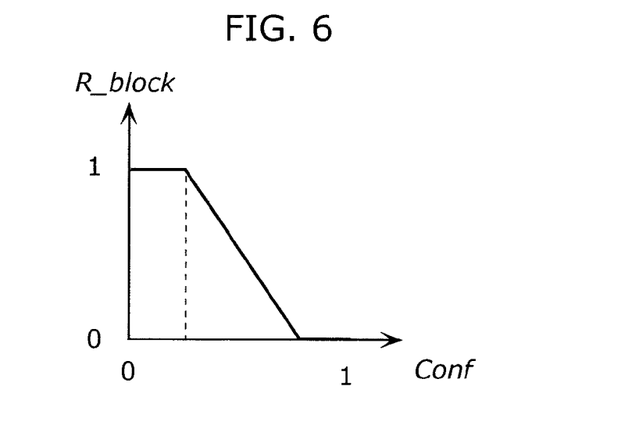
FIG. 6 is a diagram showing a method of calculating an addition ratio per block according to the embodiment of the present invention.

It is to be noted that, when the addition ratio per block is calculated, the function shown in FIG. 6 may not be necessarily used, and any function may be used as long as it satisfies the above-mentioned condition.

Next, the addition ratio calculation unit 6 calculates an addition ratio per pixel based on the addition ratio per block. The following describes a method of calculating the addition ratio per pixel with reference to FIG. 7.

Figure 7:
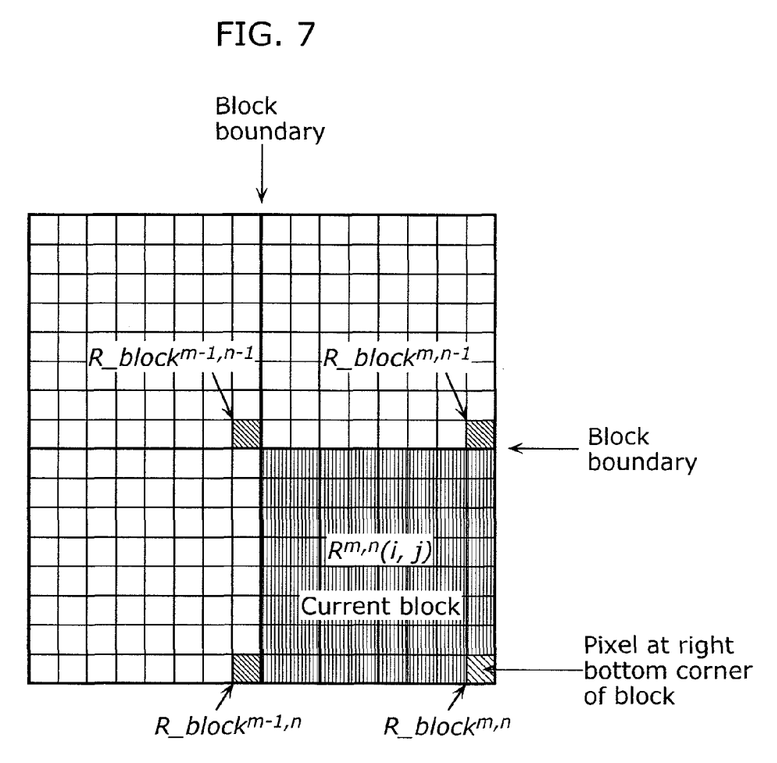
FIG. 7 is a diagram describing a method of calculating an addition ratio of each of pixels according to the embodiment of the present invention.

FIG. 7 is a diagram describing a method of calculating an addition ratio of each of pixels based on an addition ratio of a block.

Assuming that the addition ratio per block is not an addition ratio of a center pixel of a block but an addition ratio of a pixel at the right bottom corner of the block, interpolation is performed in the present embodiment.

Here, what is necessary for the interpolation are only addition ratios of blocks each on the top, left or upper left of a block to be processed. An addition ratio $R^{m,n}(i,j)$ of each of pixels of the block to be processed is calculated through (Equation 5) and (Equation 6).

[Math. 5]

$$R^{m,n}(i, (M-1)) = \frac{R\_block^{m-1,n} \times (M-1-i) + R\_block^{m,n} \times (i+1)}{M}$$ (Equation 5)

[Math. 6]

$$R^{m,n}(i, j) = \frac{R^{m,n-1}(i, N-1) \times (N-1-j) + R^{m,n}(i, N-1) \times j}{N}$$ (Equation 6)

Here, m and n indicate a lateral location and a vertical location of a block, respectively. $R\_block^{m,n}$, $R\_block^{m-1,n}$, $R\_block^{m,n-1}$, and $R\_block^{m-1,n-1}$ are addition ratios of the block to be processed (current block in FIG. 7), a left block, an upper block, and an upper left block, respectively.

M and N indicate a lateral size and a vertical size of the block. However, the following holds: i=0, 1, ..., (M−1), j=0, 1, ..., (N−1).

In the present embodiment, by using the above-mentioned interpolation method, the process of calculating the addition ratio of each pixel of the current block can be completed using only the pixel values that have been obtained, and the problem of delay does not occur.

This is because when the current block is processed, the left, upper, and upper left blocks have already been processed in raster order. In other words, this is because, at the time when the addition ratio of each pixel of the current block is calculated, the addition ratio per block, which is used for the calculation, of each of the left, upper, and upper left blocks has already been calculated.

Furthermore, whereas the conventional method of FIG. 11 requires that the addition ratios of the 8 peripheral blocks be stored, only the addition ratios of the 3 peripheral blocks are used in the present embodiment. Thus, it is necessary to store only the addition ratios of the 3 blocks. As a result, the memory usage is small, and it is possible to reduce costs of manufacturing the image processing device 10 according to the present embodiment.

Finally, the addition unit 4 adds the input image and the reference after motion compensation using the aforementioned addition ratio per pixel, and generates the output image (S25).

Specifically, where a pixel value of the input image is $I(i,j)$ and a pixel value of the motion-compensated reference image is $P(i',j')$, a pixel value of the output image $O(i,j)$ is calculated by the following (Equation 7).

As shown by (Equation 7), when an addition ratio of a pixel of the motion-compensated reference image is R, an addition ratio of a pixel, which is to be added to the pixel of the motion-compensated reference image, of the input image is 1−R.

As stated above, the addition unit 4 performs weighted sum on the pixel value of the block of the motion-compensated reference image and the pixel value of the block of the input image, using the addition ratio calculated by the addition ratio calculation unit 6, the block of the input image corresponding to the block of the motion-compensated reference image. The addition unit 4 further outputs an image resulting from the addition (S26).

[Math. 7]

$$O(i,j)=R(i,j) \times P(i',j')+(1-R(i,j)) \times I(i,j)$$ (Equation 7)

As described above, the image processing device 10 according to the present embodiment detects the block distortion of the motion-compensated reference image in the process of adding the input image and the motion-compensated reference image, and controls the addition ratio according to the block distortion amount. As a result, the image degradation of the output image can be prevented, and the output image having good image quality is obtained with the noise removed.

In addition, the image processing device 10 according to the present embodiment performs the interpolation with not the center of a block but the right bottom corner of a block being a reference position, when the addition ratio per pixel is calculated by the interpolation based on the addition ratio per block. Consequently, there is no delay, and the processing for the interpolation can be completed using the block. Further, because the memory usage is smaller in comparison with the conventional interpolation, the image processing device 10 can be easily put to practical use.

It is to be noted that part or all of the components included in the image processing device 10 described in the above embodiment may be included in an LSI that is an integrated circuit. The LSI may be referred to as an IC, a system LSI, a super LSI or an ultra LSI depending on the degree of integration.

Figure 8:
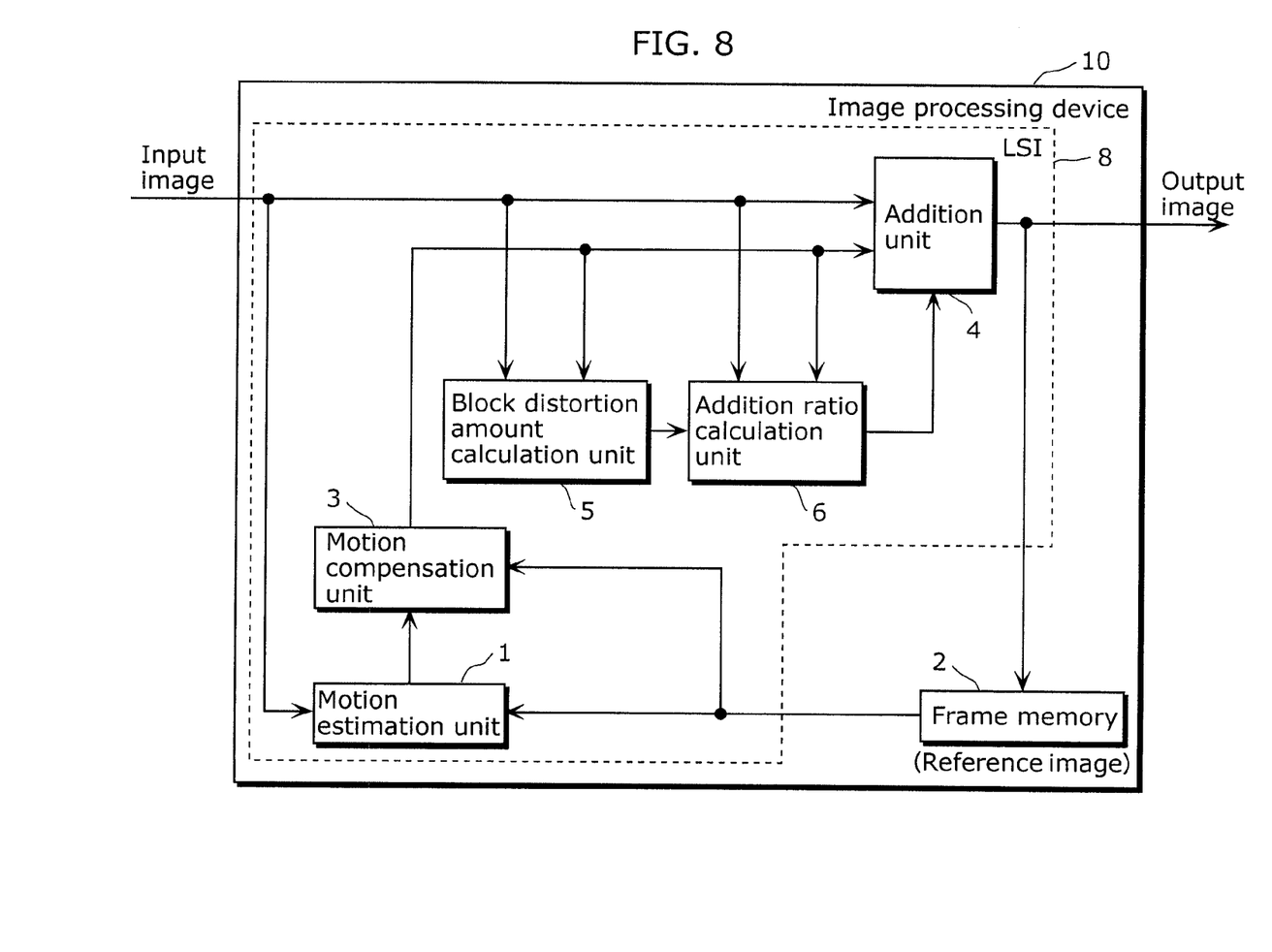
FIG. 8 is a diagram showing an example of integrated circuit implementation of the image processing device according to the embodiment of the present invention.

FIG. 8 is a diagram showing an example of integrated circuit implementation of the image processing device 10 according to the embodiment.

An LSI 8 shown in FIG. 8 is an example of an integrated circuit including functional blocks included in the image processing device 10.

It is to be noted that the functional blocks are not included in one LSI but may be decentrally included in LSIs.

Moreover, a method of integrating a circuit is not limited to the LSI, and may be achieved by a dedicated circuit or a general processor. After manufacturing the LSI, it may be possible to use FPGA (Field Programmable Gate Array) enabling programming or a reconfigurable processor enabling reconfiguration of connection or setting of circuit cells inside the LSI.

Further, if a technique of integrating circuit that substitutes for the LSI appears with progress in the semiconductor technique or another derived technique, the functional blocks may naturally be integrated using the technique.

Industrial Applicability

The image processing device and the image processing method of the present invention make it possible to detect a block distortion amount of a reference image when removing noise by adding an input image and a reference image, and to control an addition ratio according to the block distortion amount. Thus, the present invention is characterized in that good image quality is obtained by suppressing occurrence of block distortion while removing the noise from the input image. Accordingly, the present invention can be applied to image processing devices which remove noise using images and video cameras.

[Reference Signs List]

1 Motion estimation unit
2 frame memory
3 Motion compensation unit
4 Addition unit
5 Block distortion amount calculation unit
6 Addition ratio calculation unit
8 LSI
10 Image processing device

The invention claimed is:

1. An image processing device which removes noise from an input image by adding the input image to a reference image, said image processing device comprising:
 a motion estimation unit configured to detect a motion between the input image and the reference image, and to generate motion information for each of blocks of the input image;
 a motion compensation unit configured to perform motion compensation on each of blocks of the reference image using the motion information generated by said motion estimation unit, so as to generate a motion-compensated reference image;
 a block distortion amount calculation unit configured to calculate a block distortion amount for each of blocks of the motion-compensated reference image generated by said motion compensation unit;
 an addition ratio calculation unit configured to calculate an addition ratio of a block of the motion-compensated reference image so that the addition ratio decreases as the block distortion amount calculated by said block distortion amount calculation unit increases, the block of the motion-compensated reference image corresponding to the block distortion amount; and
 an addition unit configured to perform weighted sum on a pixel value of the block of the motion-compensated reference image and a pixel value of a block of the input image, using the addition ratio calculated by said addition ratio calculation unit, the block of the input image corresponding to the block of the motion-compensated reference image;
 wherein said block distortion amount calculation unit is configured to calculate the block distortion amount for the block of the motion-compensated reference image, using a difference in pixel value between neighboring pixels across a boundary between the blocks of the motion-compensated reference image.

2. The image processing device according to claim 1, wherein said block distortion amount calculation unit is configured to calculate the block distortion amount so that the block distortion amount of the block of the motion-compensated reference image increases as the difference in pixel value between the neighboring pixels across the boundary between the blocks of the motion-compensated reference image increases.

3. The image processing device according to claim 2, wherein said block distortion amount calculation unit is configured to calculate the block distortion amount so that the block distortion amount of the block of the motion-compensated reference image increases as the difference in pixel value between the neighboring pixels across the boundary between the blocks of the motion-compensated reference image increase and a difference in pixel value between neighboring pixels across a boundary between the blocks of the input image decreases.

4. The image processing device according to claim 1, wherein said block distortion amount calculation unit is configured to (i) calculate a first distortion amount which is a value that increases as a difference in pixel value between neighboring pixels across a boundary between the blocks of the motion-compensated reference image increases, (ii) calculate a second distortion amount which is a value that decreases as a difference in pixel value between neighboring pixels across a boundary between the blocks of the input image increases, and (iii) select a smaller one of the first distortion amount and the second distortion amount as the block distortion amount, so as to calculate the block distortion amount.

5. The image processing device according to claim 1, wherein said addition ratio calculation unit is further configured to calculate, through interpolation, an addition ratio for each of pixels included in the block of the motion-compensated reference image, using the addition ratio of the block of the motion-compensated reference image, and
 said addition unit is configured to perform the weighted sum on the pixel values of the pixels included in the block of the motion-compensated reference image and pixel values of pixels included in the block of the input image, using the addition ratio for the each pixel calculated by said addition ratio calculation unit, the block of the input image corresponding to the block of the motion-compensated reference image.

6. The image processing device according to claim 5, wherein said addition ratio calculation unit is configured to perform the interpolation using the addition ratio of the block of the motion-compensated reference image and respective addition ratios of at least an upper block, a left block, and an upper left block among blocks neighboring the block of the motion-compensated reference image.

7. The image processing device according to claim 6, wherein, assuming that the addition ratio of the block of the motion-compensated reference image calculated by said addition ratio calculation unit is an addition ratio of a pixel at a right bottom corner of the block of the motion-compensated reference image, said addition ratio calculation unit is configured to calculate the addition ratio for the each pixel included in the block of the motion-compensated reference image through the interpolation performed using the addition ratio of the pixel at the right bottom corner and respective addition ratios of a pixel at a right bottom corner of each of the upper block, the left block, and the upper left block.

8. An image processing method of removing noise from an input image by adding the input image to a reference image, said image processing method comprising:
 detecting a motion between the input image and the reference image and generating motion information for each of blocks of the input image;
 performing motion compensation on each of blocks of the reference image using the generated motion information, so as to generate a motion-compensated reference image;
 calculating a block distortion amount for each of blocks of the generated motion-compensated reference image;
 calculating an addition ratio of a block of the motion-compensated reference image so that the addition ratio decreases as the calculated block distortion amount increases, the block of the motion-compensated reference image corresponding to the block distortion amount; and
 performing weighted sum on a pixel value of the block of the motion-compensated reference image and a pixel value of a block of the input image, using the calculated addition ratio, the block of the input image corresponding to the block of the motion-compensated reference image;
 wherein said calculating of the block distortion amount for the block of the generated motion-compensated reference image, is performed using a difference in pixel value between neighboring pixels across a boundary between the blocks of the motion-compensated reference image.

9. A non-transitory computer-readable recording medium on which a program is recorded, said program being a program for removing noise from an input image by causing a computer to add the input image to a reference image, said program causing the computer to execute:

detecting a motion between the input image and the reference image and generating motion information for each of blocks of the input image;

performing motion compensation on each of blocks of the reference image using the generated motion information, so as to generate a motion-compensated reference image;

calculating a block distortion amount for each of blocks of the generated motion-compensated reference image;

calculating an addition ratio of a block of the motion-compensated reference image so that the addition ratio decreases as the calculated block distortion amount increases, the block of the motion-compensated reference image corresponding to the block distortion amount; and     performing weighted sum on a pixel value of the block of the motion-compensated reference image and a pixel value of a block of the input image, using the calculated addition ratio, the block of the input image corresponding to the block of the motion-compensated reference image;

wherein said calculating of the block distortion amount for the block of the generated motion-compensated reference image, is performed using a difference in pixel value between neighboring pixels across a boundary between the blocks of the motion-compensated reference image.

10. An integrated circuit which removes noise from an input image by adding the input image to a reference image, said integrated circuit comprising:

a motion estimation unit configured to detect a motion between the input image and the reference image, and to generate motion information for each of blocks of the input image;

a motion compensation unit configured to perform motion compensation on each of blocks of the reference image using the motion information generated by said motion estimation unit, so as to generate a motion-compensated reference image;

a block distortion amount calculation unit configured to calculate a block distortion amount for each of blocks of the motion-compensated reference image generated by said motion compensation unit;

an addition ratio calculation unit configured to calculate an addition ratio of a block of the motion-compensated reference image so that the addition ratio decreases as the block distortion amount calculated by said block distortion amount calculation unit increases, the block of the motion-compensated reference image corresponding to the block distortion amount; and     an addition unit configured to perform weighted sum on a pixel value of the block of the motion-compensated reference image and a pixel value of a block of the input image, using the addition ratio calculated by said addition ratio calculation unit, the block of the input image corresponding to the block of the motion-compensated reference image;

wherein said block distortion amount calculation unit is configured to calculate the block distortion amount for the block of the motion-compensated reference image, using a difference in pixel value between neighboring pixels across a boundary between the blocks of the motion-compensated reference image.

* * * * *